Jan. 20, 1959 R. VERMEULEN 2,870,265

MAGNETIC RECORDING DEVICE

Filed Oct. 1, 1952

INVENTOR

ROELOF VERMEULEN

BY [signature]

AGENT 2,870,265
Patented Jan. 20, 1959

2,870,265

MAGNETIC RECORDING DEVICE

Roelof Vermeulen, Eindhoven, Netherlands, assignor, by mesne assignments, to North American Philips Company, Inc., New York, N. Y., a corporation of Delaware Application October 1, 1952, Serial No. 312,530

Claims priority, application Netherlands November 14, 1951

2 Claims. (Cl. 179—100.2)

Figure 1:
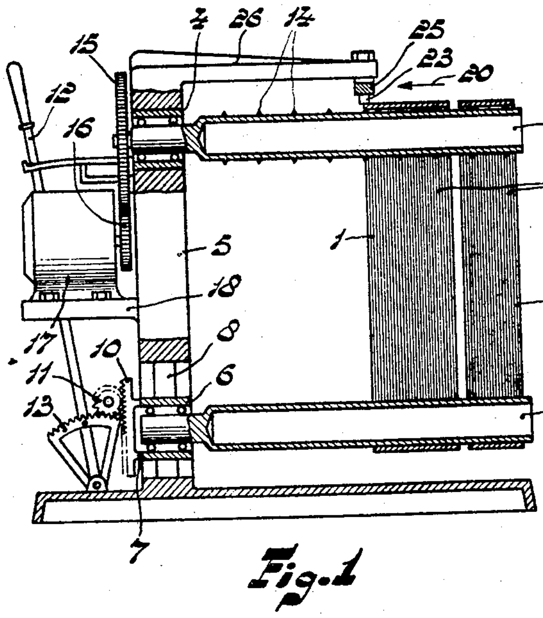

This invention relates to magnetic recording devices comprising one or more heads for recording and/or reproducing magnetic records provided or required to be provided in a helical shape on a recording tape comprising an endless carrier belt, said recording tape being carried by at least one roller, the outer circumference of which is appreciably smaller than the inner circumference of the support. The tape may be actuated by the said roller or, at a different point, by one or more other rollers.

Apart from the driving roller or rollers, several rollers arranged so that their axes are parallel to the axis of the first-mentioned roller are generally provided; the tape being conducted in the form of a loop over the latter rollers. A magnetic recording device of this type enables an extensive program to be stored on a recording tape which not only has a low weight but, in the looped condition, occupies a small amount of space. Constructional forms are known in which the guide of the tape is uncomplicated; the tape being held in a lateral direction, for example by flanges arranged on the rollers. However, provision must be made for a traverse guide for the transducer heads, which is secured to the frame of the magnetic recording device and which must be designed with the necessary accuracy. If a record in a helical form is provided on a recording tape it is known to provide the tape for this purpose with a guide which is associated with a play-back scanner secured to the head.

The magnetic recording device according to the present invention is characterized in that the surface of at least one of the rollers comprises a guide, which in order to insure axial displacement of the recording tape relative to the roller, is associated during rotation of said roller with a guide provided on the inner surface of said recording tape.

Due to the axial displacement of the recording tape in relation to the roller or rollers, the magnetic recording device of the present invention enables the heads, rollers and recording tape to move as required in relation to one another in a simple manner. For this purpose, the rollers are positioned in a lateral direction and a helical movement is imparted to the tape by cooperation between the guides on said tape and the roller, or rollers, thereby enabling the transducer heads to remain stationary and thus to be secured to the frame of the magnetic recording device.

One of the advantages of the magnetic recording device of the present invention is that replacement of the recording tape is facilitated in a simple manner, since even during operation the lateral displacement of said tape relative to the roller results in space becoming available on the guide of said roller for accommodating a subsequent recording tape. As soon as a recording tape is slipped over the supporting roller, for example by hand, the guide on said tape is capable of engaging that part of the guide on the roller which is no longer in contact with the preceding recording tape, provided the guide on the roller extends sufficiently in the axial direction of the roller. In order to limit the dimension of the magnetic recording device in the axial direction of the rollers, it is necessary that the width of the recording tape not be excessive. This results in shortening of the playtime, but since it is possible to play a plurality of tapes in succession, the shorter playtime is not inconvenient. In some cases in which a choice is to be made between a number of programs it may even be advantageous to use a plurality of narrow tapes of shorter playtime instead of a single tape of long playtime.

In a preferred embodiment of the magnetic recording device of the present invention, the guide provided on the roller is constituted by at least one profile closed on itself and arranged in a plane across the roller axis or a circumferential flange positioned in a plane perpendicular to said roller axis, and the guide provided on the recording tape is constituted by a helical profile or a helical groove.

Obviously, the profile may be constituted either by parts projecting from a surface of the roller or tape, for example in the form of flanges, collars, or a screw thread, or by recesses formed in a surface of said roller or tape, for example in the form of constrictions or a helical groove. A convenient embodiment of a recording tape for use with the magnetic recording device of the present invention may be a tape comprising on its inner surface a helical profile which is formed by a wire secured to said tape and made of magnetizable material; said wire serving both for guiding the recording tape and for storing the recorded intelligence.

Figure 2:
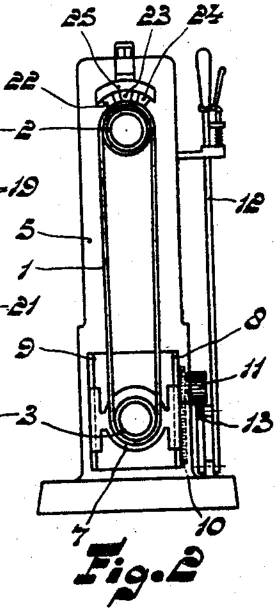
Figure 1A:
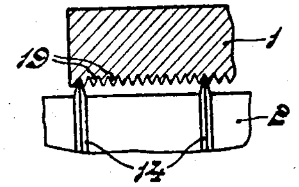

In order that the invention may be clearly understood and readily carried into effect it will now be described in detail with reference to the accompanying drawing, in which:

Fig. 1 is a schematic diagram in lateral view, partly in section, of the magnetic recording device of the present invention;

Fig. 1*a* is a schematic diagram, in enlarged detail, of a portion of Fig. 1; and Fig. 2 is a schematic diagram, in elevation, of the magnetic recording device shown in Fig. 1.

In Fig. 1, a recording tape 1 of endless carrier belt type, on which magnetic sound records are provided on the outer surface in a helical shape, is supported in a loop from two parallel rollers 2 and 3 of the magnetic recording device. The outer circumference of the rollers is appreciably smaller than the inner circumference of the tape. The rollers 2 and 3 are positioned in a vertical plane, the upper roller 2 being rigidly supported in the frame 5 of the magnetic recording device by a ball-bearing 4, whereas the lower roller 3, to insure matching to different loop sizes of the tape 1, is supported by a ball-bearing 6 which is mounted in a slide 7 adapted to be adjusted in the vertical direction. For this purpose, the slide 7 is adapted to move along guides 8, 9 and may be secured in any position by means of a toothed rack 10 secured to said slide, a pinion 11 secured to the frame 5, and a toothed segment 13 which may be operated by a hand-lever 12. The tape 1 may be facilely and simply placed in position by first reducing the distance between the rollers 2 and 3, by utilizing the hand-lever 12, and by then increasing the distance between said rollers 2 and 3 and thus slightly tensioning the tape loop.

The surface of the upper roller 2 has a guide which may be constituted by a circumferential flange positioned in a plane perpendicular to the axis of said roller or by a number of profiles closed on themselves and comprised in planes across said roller axis, said profiles being shaped in the form of collars 14, for example. By means of toothed wheels 15 and 16 the upper roller may be driven at a constant speed from a motor 17 which is secured to a base 18 of the frame 5. The lower roller is free to rotate and may have a smooth surface. The recording tape 1 is provided on the inner surface with a guide which may be constituted by a helical slit, slot, or groove 19. During rotation of the upper roller the profiles 14 and 19 of the upper roller and the tape 1, respectively, engage each other thereby enabling said tape to be displaced in an axial direction indicated in Fig. 1 by an arrow 20; the tape 1, in effect, unrolling over the upper and the lower rollers 2 and 3, respectively. When the pitch of the helical groove in the tape 1 is 50 mm., the circumference of said tape is 50 cms. and the width of said tape is 15 cms, said tape may have stored in it a record which, at a linear speed of the upper roller 2 of 9.5 cm./sec., may be played, in a time of 25 minutes. Alternatively, a plurality of recording tapes of shorter width and shorter playtime may be provided on the rollers in succession. For example, as shown in Fig. 1, two tapes 1 and 21 may be utilized. In this case, a particular program may be compiled beforehand, said program being constituted, for example, by separate sequential pieces of music, so that an effect similar to that attained with a modern automatic sequential record player is obtained. An erasing head 22, recording head 23 and reproducing head 24 may be secured in a common holder 25, at about half the length of the upper roller 2, to a lever 26 of the frame 5. As an alternative, intelligence may be stored on the inner surface of the recording tape 1. In this case, it is necessary for the transducer heads to be rigidly secured to the frame within the upper roller which is designed to be hollow, and for said roller to comprise an annular aperture at the area of said heads in order to enable the storing of intelligence on the recording tape.

It is to be understood that the invention is not limited to the details disclosed but includes all such variations and modifications as fall within the spirit of the invention and the scope of the appended claims.

Having thus set forth the nature of my invention, what I claim is:

1. A magnetic recording device comprising a record constituted by an endless carrier belt having a helical magnetic path thereon, means for driving said belt including a roller engaging the inner surface of said belt, said belt having an inner circumference substantially greater than the outer circumference of said roller, guide means formed on the outer surface of said roller, and complementary guide means formed on the inner surface of said belt in cooperative relation with said first-mentioned guide means whereby rotation of said roller effects axial displacement of said belt relative to said roller, and a transducer head cooperatively positioned with respect to said helical path on said belt.

2. A magnetic recording device comprising a record constituted by an endless carrier belt having a helical magnetic path thereon, means for driving said belt including a roller engaging the inner surface of said belt, said belt having an inner circumference substantially greater than the outer circumference of said roller, guide means formed on the outer surface of said roller, said guide means comprising a circumferential flange positioned in a plane perpendicular to the axis of said roller, and complementary guide means formed on the inner surface of said belt in cooperative relation with said first-mentioned guide means whereby rotation of said roller effects axial displacement of said belt relative to said roller, said last-mentioned guide means comprising a helical groove, and a transducer head cooperatively positioned with respect to said helical path on said belt.

References Cited in the file of this patent

UNITED STATES PATENTS

| | | |
|---|---|---|
| 456,301 | Edison | July 21, 1891 |
| 2,433,207 | Eilenberger | Dec. 23, 1947 |

FOREIGN PATENTS

| | | |
|---|---|---|
| 966,682 | France | Mar. 8, 1950 |
| 1,066,470 | France | Jan. 20, 1954 |